(12) United States Patent
Staring

(10) Patent No.: US 8,364,981 B2
(45) Date of Patent: Jan. 29, 2013

(54) RECORD CARRIER FOR STORING A DIGITAL WORK

(75) Inventor: Antonius Adriaan Maria Staring, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 2344 days.

(21) Appl. No.: 10/151,049

(22) Filed: May 20, 2002

(65) Prior Publication Data

US 2003/0007437 A1    Jan. 9, 2003

(30) Foreign Application Priority Data

May 22, 2001    (EP) .................................... 01201925

(51) Int. Cl.
*G06F 12/14* (2006.01)
(52) U.S. Cl. ............................ 713/193; 382/100; 705/57
(58) Field of Classification Search ............... 369/59.18; 713/193; 382/100; 705/57
See application file for complete search history.

(56) References Cited

U.S. PATENT DOCUMENTS

| | | | |
|---|---|---|---|
| 5,629,980 A | 5/1997 | Stefik et al. | |
| 5,638,226 A | 6/1997 | Koren | |
| 5,732,065 A * | 3/1998 | Braat et al. ................. | 369/275.1 |
| 5,757,759 A | 5/1998 | Takahashi | |
| 5,802,174 A * | 9/1998 | Sako et al. .................... | 380/201 |
| 5,892,900 A | 4/1999 | Ginter et al. | |
| 5,943,368 A * | 8/1999 | Bergmans et al. ............ | 375/295 |
| 6,064,751 A | 5/2000 | Smithies et al. | |
| 6,226,618 B1 | 5/2001 | Downs et al. | |
| 6,347,145 B2 | 2/2002 | Kato | |
| 6,362,754 B1 | 3/2002 | Van Dijk | |
| 6,523,113 B1 * | 2/2003 | Wehrenberg .................. | 713/176 |
| 6,529,147 B1 | 3/2003 | Van Dijk | |
| 6,611,607 B1 * | 8/2003 | Davis et al. ................... | 382/100 |
| 6,735,160 B1 * | 5/2004 | Miyashita et al. ......... | 369/59.12 |
| 6,738,904 B2 * | 5/2004 | Linnartz et al. ............... | 713/189 |
| 6,999,947 B2 * | 2/2006 | Utsumi et al. .................. | 705/59 |
| 7,076,668 B1 * | 7/2006 | Ono et al. ..................... | 713/193 |
| 7,206,748 B1 * | 4/2007 | Gruse et al. ........................ | 705/1 |
| 2001/0014883 A1 * | 8/2001 | Yamane et al. ................. | 705/51 |
| 2001/0021144 A1 * | 9/2001 | Oshima et al. ................. | 369/13 |
| 2001/0042043 A1 | 11/2001 | Shear et al. | |
| 2001/0044899 A1 * | 11/2001 | Levy ............................. | 713/176 |
| 2002/0009208 A1 * | 1/2002 | Alattar et al. ................ | 382/100 |
| 2002/0023219 A1 | 2/2002 | Treffers et al. | |

FOREIGN PATENT DOCUMENTS

| | | |
|---|---|---|
| EP | 1 020 856 A2 | 7/2000 |
| JP | 7-29307 | 1/1995 |
| JP | 8-161834 | 6/1996 |
| JP | 2001-43138 | 2/2001 |
| JP | 2001-189021 | 7/2001 |
| WO | WO 97 43761 | 11/1997 |
| WO | WO9917288 | 4/1999 |
| WO | WO 00 55861 | 9/2000 |
| WO | WO 00/57417 | 9/2000 |
| WO | WO0055861 | 9/2000 |
| WO | WO 00/67257 | 11/2000 |
| WO | WO 01 33317 | 5/2001 |

\* cited by examiner

*Primary Examiner* — William Powers

(57) ABSTRACT

A record carrier for storing a digital work (DW) includes access information (KLT) for gaining access to the digital work and a secondary channel (HC) in which secondary channel information (KLK) is stored which is used for encrypting, decrypting or verifying the access information (KLT). In order to prevent, hinder or discourage tampering with the access information (KLT), the secondary channel (HC) is stored on the record carrier on substantially the same physical location as the access information (KLT). In a preferred embodiment, the secondary channel information (KLK) is changed when the access information (KLT) has changed. This realizes a record carrier for which a replay-attack is prevented.

11 Claims, 4 Drawing Sheets

RECORD CARRIER FOR STORING A DIGITAL WORK

BACKGROUND OF THE INVENTION

1. Field of the Invention

The present invention relates to a record carrier for storing a digital work, a method for recording a digital work on a record carrier, a device for recording and a device for reading.

2. Description of the Related Art

European Patent Application No. EP00202888.4, corresponding to U.S. patent application Ser. No. 09/930,654, filed Aug. 15, 2001 (PH-NL000448), describes a method for controlling distribution and use of a digital work. In the method as described, a usage right information is attached to the digital work before storing the digital work and the usage right information on a record carrier. The attached usage right information is updated with every use of the digital work and is encrypted or verified using hidden information stored in a hidden channel present on the record carrier. The hidden information is changed when the usage right information has changed. Consequently, a circumvention of the usage right information attached to the digital work by a "copy and restore attack" (a so-called replay attack) can be prevented. In such a "copy and restore attack", the bits on a record carrier relating to the counters of the usage rights are copied to another storage medium. Then, the usage right is consumed, e.g., by making copies, until a copy-counter has reached zero and no further copies are allowed. The determined and stored bits are restored from the storage medium back onto the disc. Now, the disc is in a state which pretends that the usage rights have not been consumed or exercised, such that the user may continue making copies.

SUMMARY OF THE INVENTION

It is an object of the present invention to provide a record carrier for storing a digital work and access information for gaining access to the digital work, where tampering with the access information is prevented, hindered or discouraged. This object is achieved by a record carrier for storing a digital work, wherein the record carrier comprises access information for gaining access to the digital work, and a secondary channel in which secondary channel information is stored which is used for encrypting, decrypting or verifying the access information, wherein the secondary channel is stored on the record carrier on substantially the same physical location as the access information. Storing the secondary channel on the record carrier on substantially the same physical location as the access information has the following advantages: any changes to the access information will automatically destroy or alter the secondary channel information in the secondary channel; it reduces the number of jumps required to read/write the access information as the access information is encrypted/decrypted using the secondary channel information and/or the access information is verified using the secondary channel information; the access information and the secondary channel information can be written on the record carrier in a single write operation; if the access information is at a different position on the disc than the secondary channel information, there has to be at least one additional jump when reading or writing the access information. It must be noted that the secondary channel can be stored on the record carrier in different ways, e.g., by storing the secondary channel in an optically detectable periodic track modulation (a so-called wobble) or by storing the secondary channel in the data stream.

In a preferred embodiment, the secondary channel is stored on the record carrier by controlling the polarity of a predetermined runlength of a predetermined. The record carrier according to this preferred embodiment, has the advantage that the secondary channel is hidden deeply in the physical characteristics of the recorded data stream, such that a change of the integrated circuits is required to read or write to the hidden channel with existing disc drives.

In another preferred embodiment, the secondary channel information is changed when the access information is changed. This realizes a record carrier for which a replay-attack is prevented. The secondary channel information, which is used for encrypting, decrypting or verifying the access information, is changed and re-stored, when the access information has changed. Thus, a simple restoring operation of the access information in the course of a "copy and restore attack" merely restores the previous access information but does not restore the previously stored secondary channel information.

In another preferred embodiment, the access information is usage right information defining one or more conditions which must be satisfied in order for the usage right to be exercised. A fundamental issue facing the publishing and information industries as they consider electronic publishing, is how to prevent unauthorized and unaccounted distribution of usage of electronically published materials. Electronically published materials are typically distributed in a digital form and created on a computer-based system having the capability to recreate the materials. Audio and video recordings, software, books and multimedia works are all being electronically published. Royalties are paid for each accounted-for delivery, such that any unaccounted distribution results in an unpaid royalty. The transmission of digital works over networks, such as the widely used Internet, is nowadays usual practice. By storing usage right information as access information on the record carrier according to the invention, it is possible to prevent unauthorized and unaccounted distribution of the digital work stored on the record carrier. It further enables super-distribution models for the controlled distribution of copy protected digital rights. For more information on super-distribution, see, for example, European Patent Application No. EP 00204637.3, corresponding to U.S. patent application Ser. No. 10/011,889, filed Dec. 6, 2001 (PH-NL000710).

In another preferred embodiment, the secondary channel is a hidden channel which is not accessible by non-compliant reproducing devices. Due to the fact that the changed secondary channel information no longer fits or corresponds to the previous or original access information, a decryption or a verification of the access information is no longer possible, such that the protection system of the disc player will recognize the attempt of fraud. A "copy and restore attack" of the secondary channel will not work, since non-compliant, commercial reproducing devices are not capable of reading or writing on the hidden channel. A hidden channel, for example, the hidden channel as described in European Patent Application No. EP 00202846.2, corresponding to U.S. patent application Ser. No. 09/929,265, filed Aug. 14, 2001 (PH-NL000451), can be used to store the secondary channel information in order to protect the usage right information from being replayed with an older (generally more permissive) version of the usage right information (replay attack).

The invention further relates to a method for recording a digital work on a record carrier, a device for recording and a device for reading. The method comprises the following steps: —recording the digital work on the record carrier, —recording access information for gaining access to the digital work and a secondary channel in which secondary channel information is stored which is used for encrypting, decrypting or verifying the access information on the record carrier, the secondary channel and the access information being recorded on the record carrier on substantially the same physical location. Recording the access information together with the secondary channel information on the record carrier has the advantage that by recording the access information, the previous version of the secondary channel information is deleted and vice versa. Recording the secondary channel and the access information on substantially the same physical location has the advantage that the number of jumps required to write the access information and the secondary channel information is reduced.

BRIEF DESCRIPTION OF THE DRAWINGS

In the following, the present invention will be described in greater detail with reference to the accompanying drawings, of which.

DESCRIPTION OF THE PREFERRED EMBODIMENTS

An example will now be described on the basis of an Electronic Music Download (EMD) application for purchasing a music track and downloading the track from the Internet and storing it onto a record carrier, such as a recordable optical disc.

Nevertheless, in the present application, the term "digital work", refers to any work that has been reduced to a digital representation. This includes any audio, video, text or multimedia work and any accompanying interpreter (e.g., software) that may be required for recreating the work. The term "usage rights" refers to any rights granted to a recipient of a digital work. Generally, these rights define how a digital work can be used and if it can be further distributed. Each usage right may have one or more specified conditions which must be satisfied for the right to be exercised. The usage rights are permanently "attached" to the digital work. Copies made of a digital work will also have usage rights attached. Thus, the usage rights and any associated fees assigned by a creator and subsequent distributor will always remain with a digital work.

Figure 1:
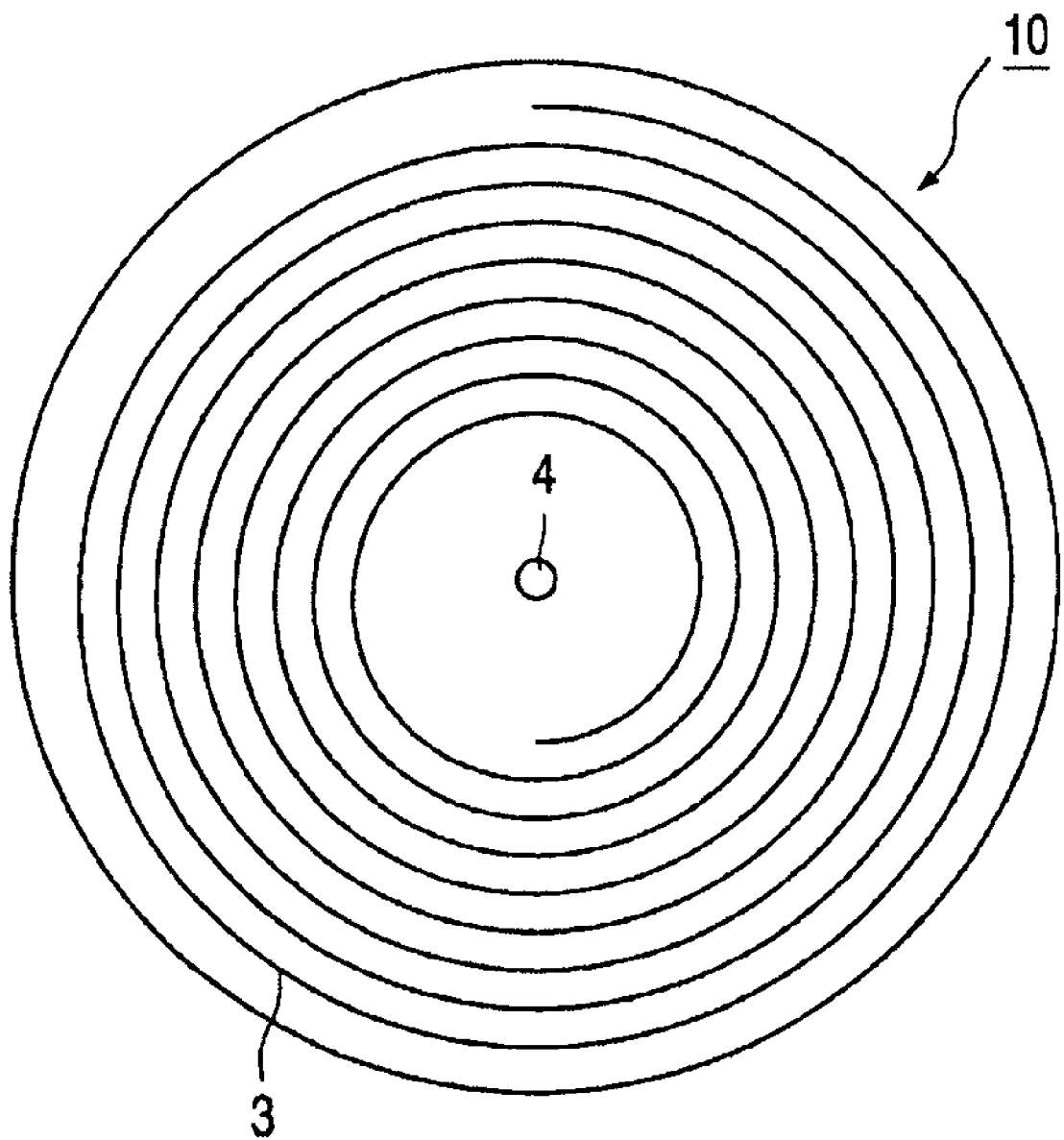
FIG. 1 shows a record carrier according to a preferred embodiment of the present invention.

FIG. 1 shows a concentrically formed record carrier 10, for example, a recordable optical disc, in particular, a CD or a DVD, with a track 3 and an opening 4 lying in the center. The track 3 is arranged in a spiral or concentric pattern for storing information. In the track 3 of the record carrier, a digital work and access information for gaining access to the digital work is or can be stored. The access information can, for example, be usage right information, for example, a key locker (as described in EP00202888.4 (PH-NL000448)). The record carrier 10 further contains a secondary channel in which secondary channel information is stored. This secondary channel information is used for encrypting, decrypting or verifying the access information and, for example, is a key locker key, used for giving access to the usage right information present in the key locker. The secondary channel preferably is a hidden channel which is not accessible by non-compliant reproducing devices. In order to prevent, hinder or discourage tampering with the access information, the secondary channel is stored on the record carrier underneath the access information. In a preferred embodiment of the record carrier according to the invention, the secondary channel information is changed when the access information has changed. This realizes a record carrier for which a replay-attack is prevented.

According to another preferred embodiment of the record carrier according to the invention, the access information comprises all kinds of secrets relating to the access information, e.g., usage right information defining one or more conditions which must be satisfied in order for the usage right to be exercised, keys, counters, an own identification of the disc or any information which is to be stored in a tamper-free way. This access information is stored together in a table which is called a key-locker table KLT. The key-locker table KLT is encrypted e.g., by a DES algorithm and stored on the disc in any convenient location. The key used for encrypting the key-locker KLT is called the key-locker key KLK. This key KLK is stored on the disk in the secondary channel, for example, in a special hidden channel or secure side channel which cannot be read or written by existing or conventional disc drives. In particular, the hidden channel must be arranged such that a firmware update of existing disc drives is not sufficient to enable a reading or writing operation of the hidden channel.

The hidden channel must be hidden very deeply in the physical characteristics of the recorded data stream, record carrier or disc drive, such that a change of the integrated circuits is required to read or write to the hidden channel with existing disc drives. Some possibilities for implementing such a hidden channel are:

(i) storing the hidden information (key) in deliberate errors of the data stream, which can be corrected again;

(ii) storing the hidden information in merging bits of a runlength-limited code sequence;

(iii) storing the hidden information by controlling the polarity of a predetermined runlength of a predetermined data or control symbol of a runlength-limited code sequence, according to the hidden information; or (iv) storing the hidden information in deliberate errors in the time-base of the data stream.

However, any other hidden channel suitable to prevent a reading or writing of the hidden information with existing disc drives can be implemented.

The key-locker table KLT is re-written each time its content is changed, e.g., when the usage right is consumed. Then, a new random key-locker key KLK is used each time the key-locker table KLT is re-written.

Figure 2:
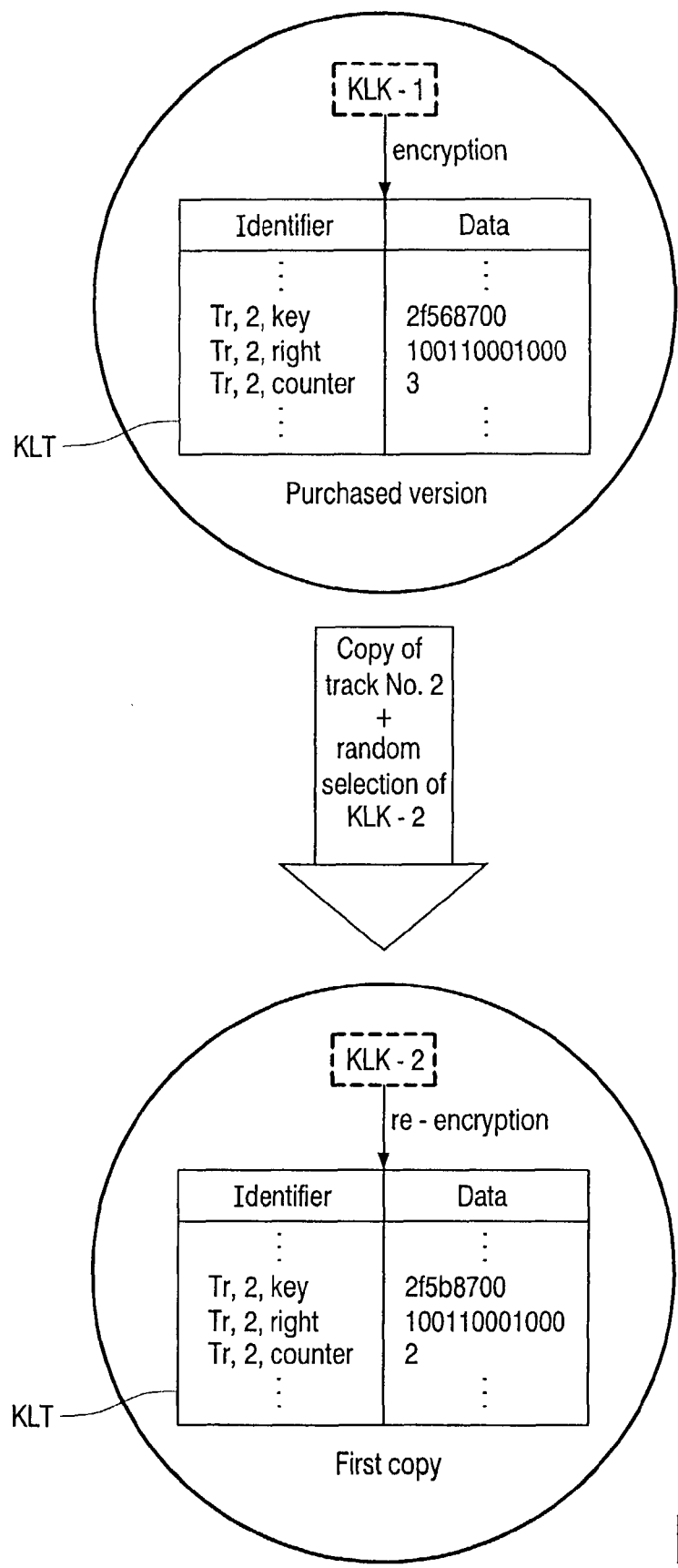
FIG. 2 shows a modification of a key-locker table and a hidden key after a copy operation.

FIG. 2 shows a purchased version of the key-locker table KLT written on a recordable optical disc, which is encrypted by a first key-locker key KLK-1 stored in a hidden channel of the optical disc, e.g., as indicated above. In the example shown in FIG. 2, the user has purchased a right to make three copies of track No. 2. In the key-locker table KLT shown in FIG. 2, only the content relevant to track No. 2 is shown, wherein the table comprises an identifier portion and a data portion and wherein the identifier portion includes an information used for identifying the respective data in the data portion. In particular, a key (indicated in hexadecimal notation) is followed by a track No. 2 usage right for track No. 2 (indicated in binary notation) and by a counter value of track No. 2, which is set to "3" in line with the purchased usage right.

After the copy operation of track No. 2, a new key-locker-key KLK-2 is randomly selected by the disc drive, used for re-encrypting the updated key-locker table KLT, and stored in the hidden channel. Thus, as indicated in the lower part of FIG. 2, after the first copy of track two, the key-locker table KLT has been re-encrypted by the new key-locker key KLK-2 and updated by decreasing the counter value in the key-locker table KLT to "2".

Accordingly, an extraction and intermediate storage of the original or purchased key-locker table KLT, followed by a re-storing after the first copy operation is useless, since the new key-locker key KLK-2 is now stored in the hidden channel and a decryption of the key-locker table KLT would now no longer be possible by the disc drive. Accordingly, any "copy and restore attack" is readily detected by the disc drive or at least leads to an error.

Figure 3:
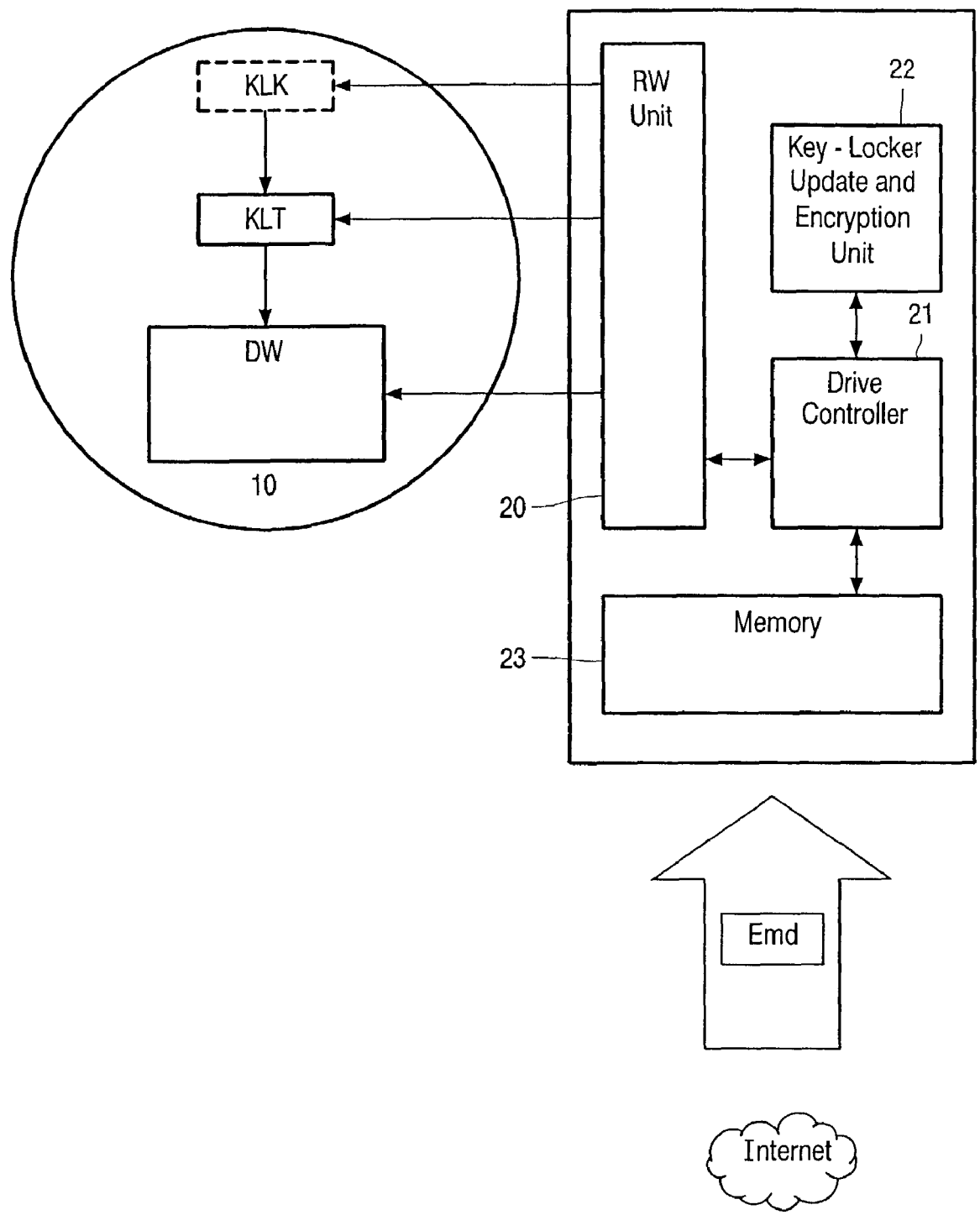
FIG. 3 shows a basic block diagram of a driving device for driving the record carrier according to the invention.

FIG. 3 shows a basic block diagram of a disc drive for driving the record carrier according to the invention, which is arranged to generate and write a key-locker table KLT together with a digital work DW (i.e., a music track or the like) on a recordable disc 10 based on usage right acquired together with a purchase from the Internet. In particular, an EMD application, which may run on a computer system to provide a corresponding download function, stores the purchased scrambled digital work together with the key required for descrambling the digital work, and a description of the usage rights in a memory 23 of the disc drive. As an alternative, the purchased pieces of information may be stored in a memory of the computer system from which they are read by a drive controller 21 of the disc drive.

The drive controller 21 reads the purchased pieces of information from the memory 23 and supplies the key and the usage rights to a key-locker update and encryption unit 22 which is arranged to generate a corresponding key-locker table KLT and to randomly select a key-locker key KLK used for encrypting the key-locker table KLT. The drive controller 21 receives the generated key-locker table KLT and key-locker key KLK and controls a reading and writing (RW) unit 20 so as to write the purchased digital work DW (i.e., music track) and the key-locker table KLT at predetermined positions on the recordable disc 10. Furthermore, the drive controller 21 controls the RW unit 20 so as to store the key-locker key KLK in a hidden channel of the recordable disc 10, which is not accessible by conventional disc drives or disc players. With every change of the purchased usage right due to a consumption (i.e., copy or play operation), the drive controller 21 supplies a corresponding control signal to the key-locker update and encryption unit 22 which updates the key-locker table KLT correspondingly, generates a new randomly selected key-locker key KLK, and encrypts the key-locker table KLT using the new key-locker key KLT. The drive controller 21 receives the updated and scrambled key-locker table KLT and the new key-locker key KLK and controls the RW unit 20 so as to write the re-scrambled key-locker table KLT onto the recordable disc 10 and the new key-locker key KLK in the hidden channel. The new key-locker key KLK can be written underneath the key-locker table KLT in a single write operation. This updating and re-encryption by using a new key-locker key KLK is thus performed after each change inside the key-locker table KLT.

If the updated key-locker table KLT indicates that the usage rights have been exercised or consumed, the disk controller 21 refuses the use of the respective digital work, e.g., by transmitting a corresponding error message or control signal to the EMD application. It is to be noted that the key-locker update and encryption unit 22 may be implemented as a software routine of the drive controller 21.

Figure 4:
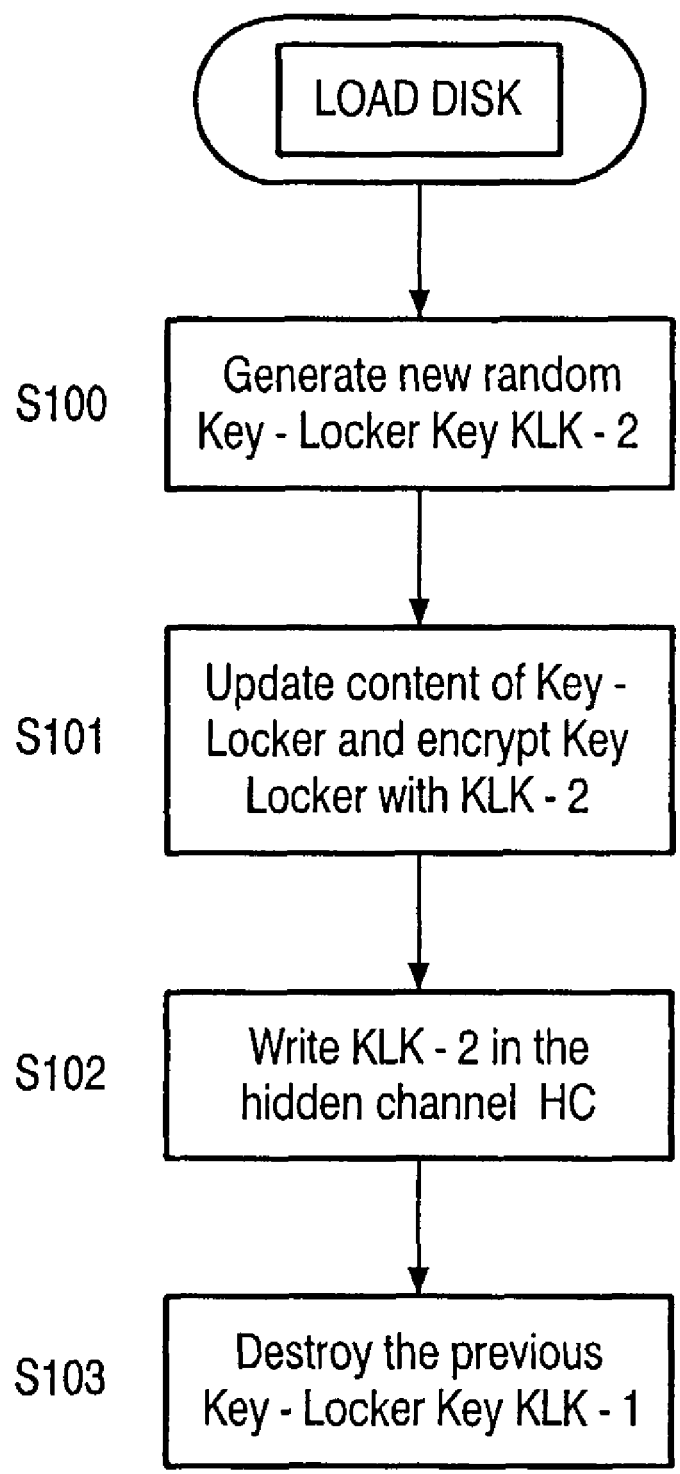
FIG. 4 shows a basic flow diagram of a secure update of access information, in particular usage right information.

FIG. 4 shows a basic flow diagram of the above procedure for a secure update of the access information, in particular, usage rights. According to FIG. 4, a new random key-locker key KLK-2 is generated in step S100 after the recordable disc has been loaded into the disc drive and a corresponding usage operation of the digital work has been started. Then, the content of the key-locker table KLT is updated and encrypted with the new key-locker key KLK-2 by the key-locker update and encryption unit 22 (step S101). Thereafter, the new key-locker-key KLK-2 is written by the RW unit 20 in the hidden channel HC of the recordable disc 10 (step S102). This step may be followed by the optional steps of verifying that the new key-locker key KLK-2 and the re-encrypted key-locker table KLT have been written correctly on the recordable disc 10. Finally, the previous key-locker key KLK-1 may be destroyed by the RW unit 20 (step S103).

According to an alternative modification of the preferred embodiment, the key-locker update and encryption unit 22 may be replaced by a key locker update and verification unit arranged to calculate a checksum over the content of the key-locker table KLT and to store this checksum in the hidden channel HC (instead of the key-locker key KLK). In this case, the key-locker table KLT even does not need to be encrypted. Any manipulation of the content of the key-locker table KLT can be verified by the key-locker update and verification unit by a checking operation using the hidden checksum. Any change of the key-locker table KLT resulting from a consumption or exercise of the purchased usage rights leads to a changed checksum which is written in the hidden channel HC. Thus, the "copy and restore attack" will lead to a mismatch between the actual checksum of the restored key-locker table KLT and the hidden check sum. This mismatch will be detected by the key-locker update and verification unit, such that an error processing or protection mechanism may be started.

Thus, this preferred embodiment describes a record carrier having the advantage that a "copy and restore attack" performed on the record carrier leads to a mismatch between the hidden key-locker key KLK or the alternative hidden checksum and the restored key-locker table KLT. This mismatch either prevents a descrambling of the key-locker table KLT or leads to an error in the verification processing. Thus, the fraud attack can be detected at the disc drive.

In another embodiment, the hidden channel comprises random data which is used for calculating a checksum over the content of the key-locker table KLT and which checksum is stored in the user data, therefore, freely accessible, both for compliant and non-compliant devices. If it is ascertained that the content of the hidden channel cannot be deterministically changed by a non-compliant device, the content of the hidden channel may be freely accessible. A compliant device can calculate the checksum by reading the random data in the hidden channel and check whether the calculated checksum corresponds to the checksum present in the user data. A calculated checksum which differs from the checksum present in the user data indicates that the content of the hidden channel might have been tampered with.

It is noted that the present invention is not restricted to the above embodiments, but can be applied to any recording or writing applications which should be protected against "copy and restore attacks". The EMD may be performed by a free distribution of the scrambled digital work DW on a pressed disc or via a broadcast channel. The key, however, is then not distributed together with the content of the digital work. It can be purchased via the Internet. In such a case, a download of the compressed digital work is not necessary, only the keys have to be downloaded. Thereby, the network load and transmission costs can be decreased.

Furthermore, the key-locker table KLT may be arranged as one key-locker table per track. In this case, enough capacity of the hidden channel is required to store a random key-locker key KLK for each key-locker table KLT. The key-locker table KLT could be split into a plurality of key-locker tables if its size becomes too big to perform a re-writing operation at each transaction. Then, each key-locker table KLT will have its own random key-locker key KLK stored in the hidden channel.

The present invention may as well be applied to protect hard discs against "copy and restore attacks". In this case, the hidden channel could be arranged as a memory embedded within the HDD controller. A similar application is possible for flash memory cards or the like. Generally, the present invention can be applied to protect any further recording medium, e.g., magneto-optic recording medium (minidisc) or magnetic tape.

The invention claimed is:

1. A non-transitory machine-readable record carrier storing a digital work, said record carrier comprising:
    a first data area at a first physical location on the record carrier storing machine-readable access information controlling access to the digital work, and
    a second, re-writable data area comprising a secondary channel and located substantially at the first physical location on the record carrier, the secondary channel storing secondary channel information used for encrypting, decrypting or verifying the access information, wherein the secondary channel information is re-written when the access information has changed.

2. The non-transitory machine readable record carrier as claimed in claim 1, wherein the secondary channel is stored on the record carrier by controlling the polarity of a predetermined runlength of a predetermined data or control symbol of a runlength-limited code sequence.

3. The non-transitory machine readable record carrier as claimed in claim 1, wherein the access information is usage right information defining one or more conditions which must be satisfied in order for the usage right to be exercised.

4. The non-transitory machine readable record carrier as claimed in claim 1, wherein the secondary channel is a hidden channel which is not accessible by non-compliant reproducing devices.

5. The non-transitory machine readable record carrier as claimed in claim 1, wherein said record carrier is a recordable optical disc.

6. The non-transitory machine readable record carrier claimed in claim 5, wherein the recordable optical disc is one of a CD and a DVD.

7. The non-transitory machine readable record carrier as claimed in claim 1, wherein said record carrier is a hybrid record carrier comprising a read-only part and a write part.

8. The non-transitory machine readable record carrier according to claim 1, wherein the secondary channel is stored on the hidden channel underneath the access information.

9. A method for recording a digital work on a record carrier, the method comprising the following steps:
    recording the digital work on the record carrier;
    recording access information for gaining access to the digital work and a secondary channel in which re-writable secondary channel information is stored which is used for encrypting, decrypting or verifying the access information on the record carrier, the secondary channel and the access information being recorded at substantially the same physical location on the record carrier, wherein the secondary channel information is re-written when the access information has changed.

10. A device for recording a digital work on a record carrier, the device comprising:
    first recording means for recording the digital work on the record carrier; and
    second recording means for recording access information for gaining access to the digital work and a secondary channel in which re-writable secondary channel information is stored which is used for encrypting, decrypting or verifying the access information on the record carrier, the second recording means recording the secondary channel and the access information at substantially the same physical location on the record carrier, wherein the secondary channel information is re-written when the access information has changed.

11. A device for reading a record carrier for storing a digital work, wherein the record carrier comprises access information for gaining access to the digital work, and a secondary channel in which secondary channel information is stored which is used for encrypting, decrypting or verifying the access information, wherein the secondary channel is stored on the record carrier at substantially the same physical location as the access information, the device comprising:
    first reading means for reading the digital work from the record carrier: and
    second reading means for reading access information for gaining access to the digital work and a secondary channel in which secondary channel information is stored which is used for encrypting, decrypting or verifying the access information from the record carrier, the secondary channel and the access information being stored at substantially the same physical location on the record carrier, wherein the secondary channel information is re-written when the access information has changed.

* * * * *